UNITED STATES PATENT OFFICE.

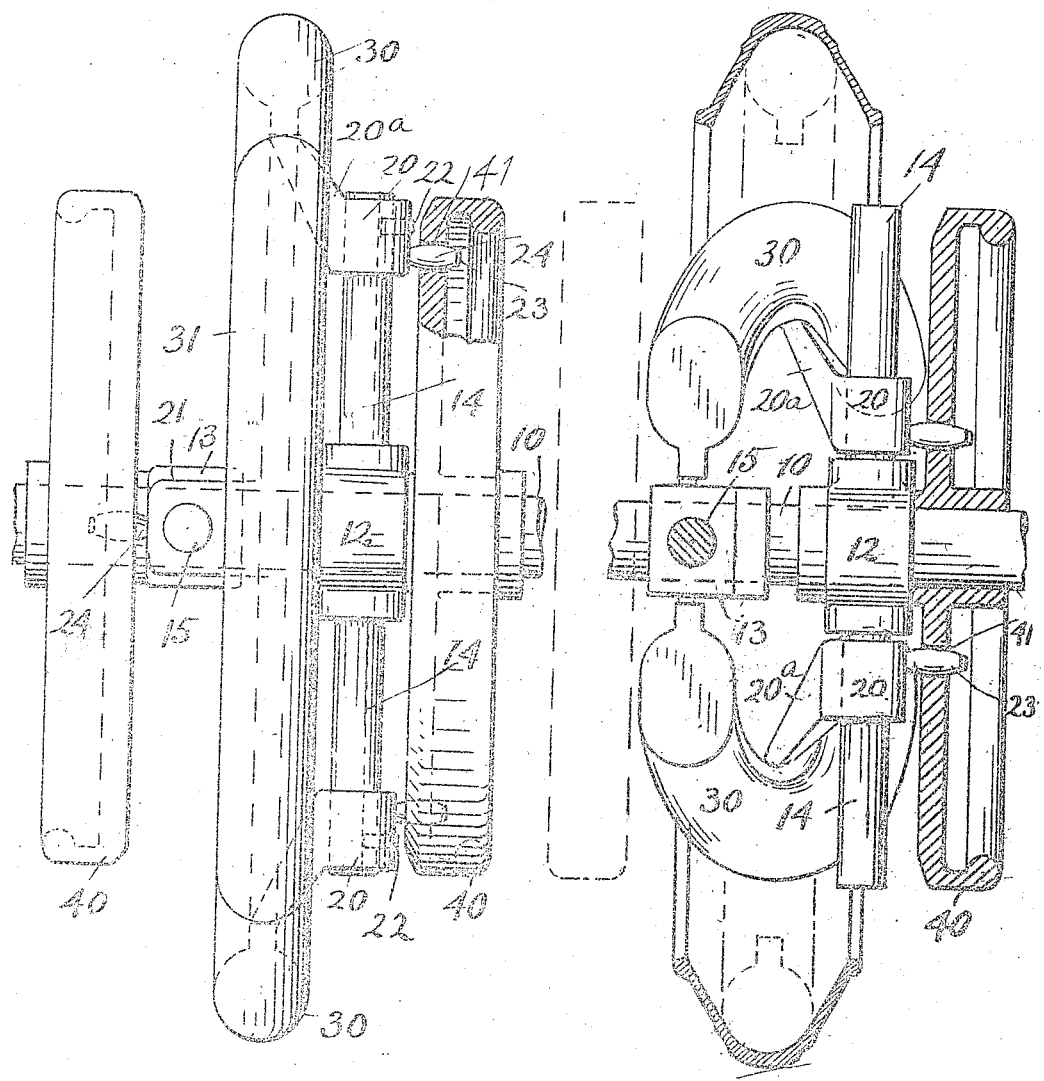

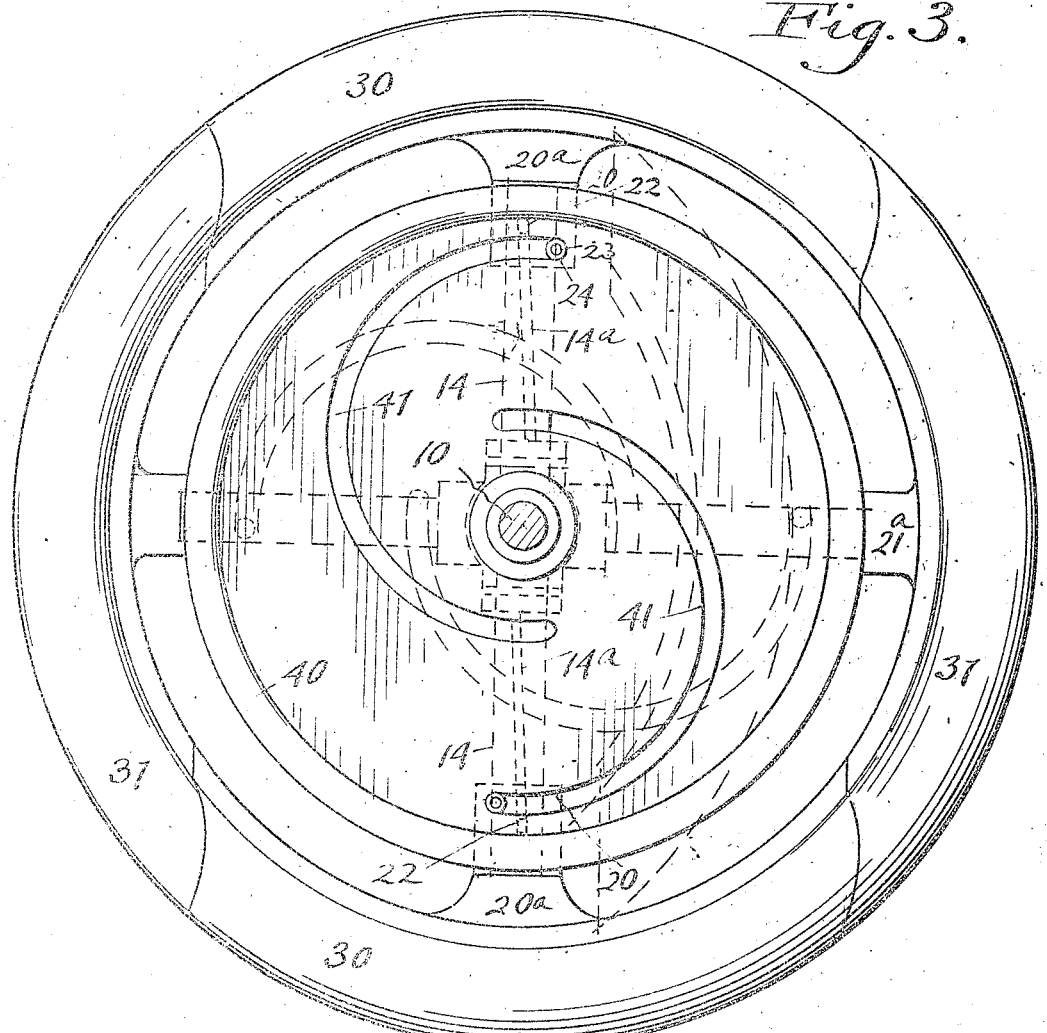
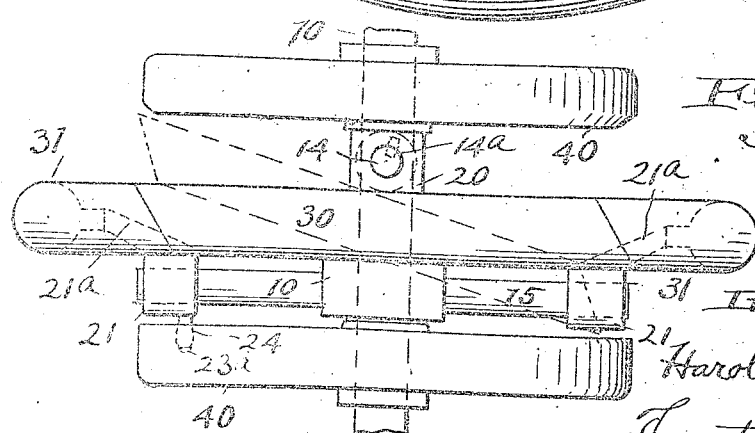

HAROLD A. DENMIRE, OF AKRON, OHIO, ASSIGNOR TO THE GENERAL TIRE & RUBBER COMPANY, OF AKRON, OHIO, A CORPORATION OF OHIO.

COLLAPSIBLE TIRE-CORE.

1,399,936.  Specification of Letters Patent.  Patented Dec. 13, 1921.

Application filed July 9, 1921. Serial No. 483,499.

*To all whom it may concern:*

Be it known that I, HAROLD A. DENMIRE, a citizen of the United States, residing at Akron, in the county of Summit and State of Ohio, have invented a certain new and useful Improvement in Collapsible Tire-Cores, of which the following is a full, clear, and exact description.

This invention relates to the kind of collapsible tire core structures, typified by my prior Patent No. 1,358,941, granted Nov. 16, 1920, in which the core may be collapsed and expanded without being demounted from the shaft upon which the core must be rotatably supported when the tire casings are being formed thereon. In such structures the core is made up of a plurality, preferably two, pairs of arc-shaped sections supported on guides upon which they may be moved to the expanded position in which they are circumferentially alined and form an annular tire core, and, from the expanded to a collapsed position such that the finished tire may be removed, and vice versa.

The present invention relates to the means for supporting and moving said core sections and for causing at least one pair of core sections, as they are moved toward the axis of the supporting shaft, to move out of the way of the other core sections so that they may also be moved toward the axis of the shaft, and, as they are moved away from said shaft, to move into circumferential alinement with the other core sections.

The invention consists in the construction and combination of parts shown in the drawings as hereinafter described and pointed out definitely in the appended claims.

In the drawings, Figure 1 is a front elevation of a collapsible tire structure embodying the present invention when the core sections are in their expanded positions; Fig. 2 is a front elevation partly in section showing the position which one pair of core sections take when they are in their collapsed position. Fig. 3 is a side view of the structure, and Fig. 4 is a top view of the structure when the core sections are expanded.

The mechanism includes a shaft 10 to which are secured a plurality of pairs of radial guide bars,—the two guide bars of each pair being extended in diametrically opposed directions. The guide bars 14, 14, of one pair are fixed to a collar 12 fast on shaft 10; and the guide bars 15 of the other pair are secured to another collar 13 fast on said shaft; and the guide bars 15 are at right angles to the guide bars 14. On each of the guide bars 14, which are cylindrical, a sliding collar 20 is fitted; and on each of the guide bars 15 a sliding collar 21 is fitted. These collars have arms, represented respectively by $20^a$ and $21^a$, each of which extends toward a plane between the two pairs of guide bars and away from the axis of the supporting shaft 10. Each of these arms is connected at its outer end to the middle part of one of four arc-shaped sections. The pair of sections which are connected with the arms $20^a$ are represented by 30, and those which are connected with the arms $21^a$ are represented by 31.

In the surface of each of the guide bars 14 a long spiral groove $14^a$ is formed, which groove extends about ⅛ of the distance around said guide bars.

Each of the collars 20 is provided with an inwardly extended pin 22 which projects into the associated groove $14^a$. If the two collars 20 are moved upon their guide bars 14 toward the axis of the shaft they will simultaneously be turned about the axis of the guide bar by the action of the inclined grooves upon the pins 22, and thereby the core sections attached to these collars will be swung out of the plane in which they lie when in their expanded position.

As these core sections are moved along the guide bars toward the axis of the shaft 10 they will be withdrawn from the tire casing which has been formed upon the expanded core. It makes it easier to move said core sections in and cause them to turn as stated, if before that inward movement is begun, the inner edges of the tire casing be spread apart laterally as indicated in Fig. 2. When these core sections 30 have reached the limit of their inward movement they will have been swung so far out of the plane in which the other core sections 31 lie that said other core sections may then be moved toward the axis of the shaft a distance sufficient to substantially withdraw them from the tire casing.

The guide bars 15 as shown do not have the spiral grooves, nor do the collars thereon have pins projecting into said grooves. If desirable this pin and groove connection between the guide bars 15 and the collars thereon could be provided; but if the spiral grooves in the guide bars 20 are extended around said guide bars sufficiently they will cause such a turning of the core sections 30 that said core sections will not interfere with the straight radial inward movement of the other core sections 31.

Any suitable means may be employed for moving these collars and core sections outward and inward. The means shown for this purpose include two hand wheels 40 which are rotatably mounted upon the shaft on opposite sides of the core supporting collars 12, 13. These wheels are of the flat disk form, and in each of them are two cam shaped grooves 41. Pins 23 carrying rollers 24 are respectively secured to the two collars 20 and these project respectively into the two cam grooves 41 on the adjacent hand wheel 40. Similar studs 23ª carrying rollers 24 are fixed to the collars 21 and these project respectively into the cam grooves in the other hand wheel.

If, when the core sections are in the expanded position, the right hand wheel be turned, the core sections 30 will be moved along the guide bars 14 toward the axis of the shaft, and will be turned about the axis of said guide bars by the action of the spiral groove. When these core sections have been so moved to the collapsed position the other hand wheel will be turned, and thereby, through the described mechanism, the other core sections will be moved toward the axis of the shaft to their collapsed position. When the core sections are in the collapsed position the tire casing may be removed.

It will be understood of course that the meeting ends of the core sections must be so shaped that the core sections 30 can be moved inward from their position between the core sections 31, and so that, after the core sections 31 have been moved out to their expanded positions, the core sections 30 may also be moved out and turned into the positions in which they are circumferentially alined with the core sections 31.

Having described my invention, I claim:—

1. In a collapsible tire core, the combination of a shaft, a pair of diametrically opposed radial guide bars each having an inclined groove, a pair of arc-shaped core sections which are slidably supported on said guide bars respectively, each of said core sections having a pin which projects into the groove in the guide bar in which it is supported.

2. In a collapsible tire core, the combination of a shaft, a pair of diametrically opposed radial guide bars each having an inclined groove, a pair of arc-shaped core sections which are slidably supported on said guide bars respectively, each of said core sections having a pin which projects into the groove in the guide bar in which it is supported, and means for moving both of said core sections along said guide bars toward and away from the supporting shaft.

3. In a collapsible tire core, the combination of a shaft, a pair of diametrically opposed radial guide bars each having an inclined groove, a pair of arc-shaped core sections which are slidably supported on said guide bars respectively, each of said core sections having a pin which projects into the groove in the guide bar in which it is supported, a wheel which is rotatably mounted on said shaft and is provided with two cam grooves, and projections connected with each of said movable core sections extending into said cam grooves.

4. A collapsible tire core comprising, in combination, a shaft, a pair of diametrically opposed radial guide bars each having an inclined groove, a second pair of diametrically opposed radial guide bars which stand at right angles to those first mentioned, an arc-shaped core section slidably supported upon each of said guide bars, which core sections are so constructed that when they are circumferentially alined they will form an annulus, means for simultaneously moving inward or outward the pair of core sections which are supported on the first named radial guide bars, projections secured to said core sections extending into the inclined groove on said guide bars, and other means for moving inward or outward the other two core sections.

5. In a collapsible tire core, the combination of two pairs of arc-shaped core sections adapted when circumferentially alined to form an annulus, radial supports upon which said core sections are slidably supported, a pair of wheels rotatably mounted upon said shaft each having two cam shaped grooves, pins carried by two diametrically opposed core sections which respectively project into cam grooves in one cam wheel, and pins secured respectively to the other two core sections, which pins project respectively into the two cam grooves of the other wheel.

In testimony whereof, I hereunto affix my signature.

HAROLD A. DENMIRE.